Nov. 14, 1939.  W. G. HARDT  2,180,146
ROAD MAP MOUNTING MEANS FOR AN AUTOMOBILE
Filed March 20, 1939
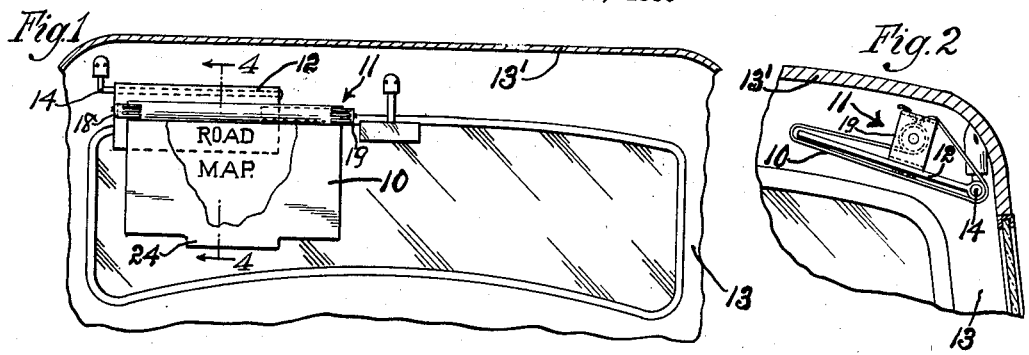
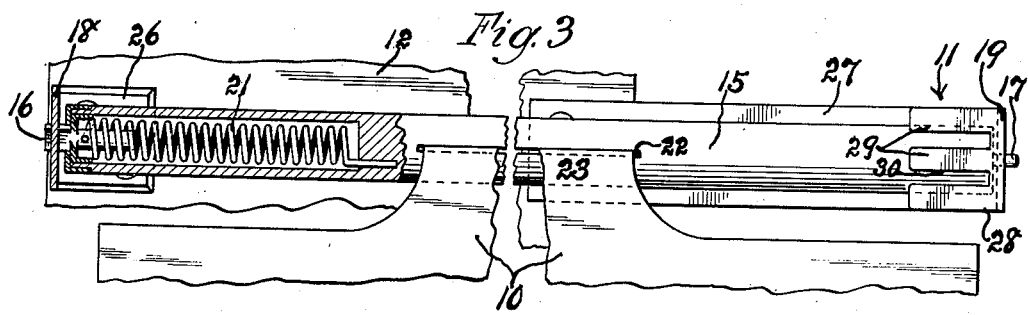
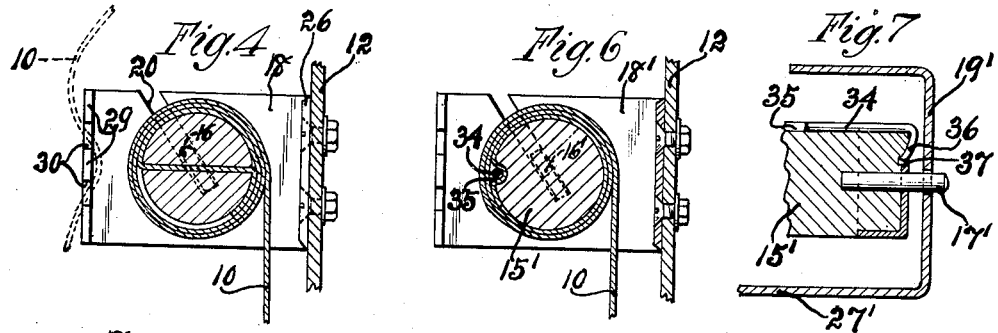
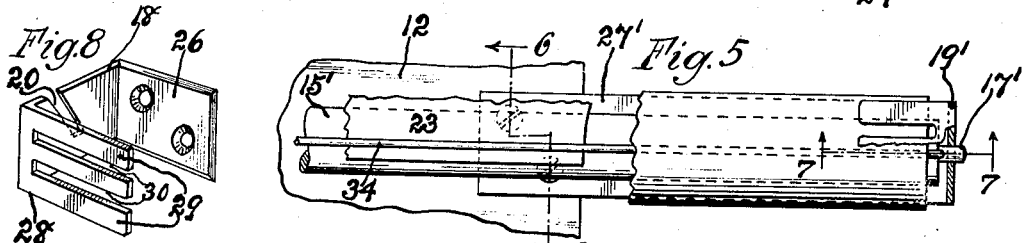
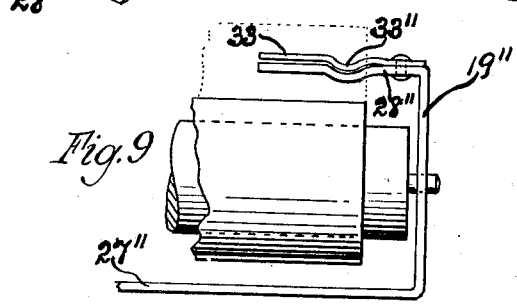
INVENTOR.
William G. Hardt
BY J. Daniel Stuwe
ATTORNEY.

Patented Nov. 14, 1939

2,180,146

UNITED STATES PATENT OFFICE 2,180,146

ROAD MAP MOUNTING MEANS FOR AN AUTOMOBILE

William G. Hardt, Chicago, Ill.

Application March 20, 1939, Serial No. 262,805

7 Claims. (Cl. 40—85)

This invention relates to a new and improved road map mounting means for an automobile.

One of the main objects of this invention is to provide a device or means whereby a road map can be readily mounted in a handy and out-of-the-way position at the upper front part of an automobile, so that it can be readily grasped and opened and can be quickly and conveniently consulted by the driver and by other occupants, and when released is automatically retracted and held out of the way.

Another object of this invention is to provide an inexpensive device whereby the ordinary road map can be readily mounted in the front part of the automobile to be conveniently opened and closed by the use of one hand, and wherein the map can also be conveniently detached and replaced with another map of a different locality.

A more specific object of this invention is to provide such mounting means whereby the road map can be mounted and carried in a compact roll on the sun visor in the automobile, so that it can be readily suspended from the visor for inspection, and may be automatically rolled up thereon in an out-of-the-way position; and whereby the map can furthermore be held extended across the nether face of the visor when swung up horizontally under the top of the automobile, to display the map in an out-of-the-way position underneath the visor.

These and various other objects and advantages are attained with this invention, as will become apparent from the following description, taken in connection with the accompanying drawing wherein the invention is shown in a few of its preferred forms; it being understood that other arrangements and forms of construction may be adopted in carrying out the objects and purposes of this invention.

This application is a continuation-in-part of my former application for patent on Means for mounting a road map in an automobile, Serial No. 197,643, filed March 23, 1938.

In the drawing:

Fig. 1 is an elevational view showing a front portion of an automobile with my invention mounted on the sun visor depending therein, and the map extending down from the visor.

Fig. 2 is a view from one side thereof, on a slightly enlarged scale, showing the map extended across the nether face of the upswung visor.

Fig. 3 is an enlarged view of this invention in its preferred form, with parts broken away.

Fig. 4 is an enlarged cross-sectional view thereof, taken substantially on line 4—4 of Fig. 1, indicating in dotted lines how the end of the map may be held on the bracket in the manner shown in Fig. 2.

Fig. 5 is a partial view showing this invention with a modified form of holding means for fastening the inner end of the map on the roller.

Figs. 6 and 7 are enlarged sectional views of this form, taken on line 6—6 and 7—7 of Fig. 5, respectively.

Fig. 8 is a perspective view of the improved bracket used at the left-hand end of the visor, with its spaced fingers for holding the outer end part of the map.

Fig. 9 is a partial view showing a modified form of bracket including different form of map edge holding means thereon.

In carrying my invention into effect, I mount the road map with my improved means for supporting it in a convenient elevated position in the upper front part of the automobile, so that the map is normally retained in a small pack by being rolled, folded, telescoped or the like, and is held out of the way; and so that it can also be very easily grasped and opened by the use of only two fingers and can be conveniently consulted by the driver or other occupants of the automobile.

In the drawing I have illustrated this invention as comprising a road map 10 which is carried by its mounting means 11 and is thereby attached to the customary sun visor 12 which is swingably mounted at the upper front section 13 of an automobile, adjacent the top 13' thereof. The map is preferably mounted on the inward side of the depending visor 12, and is thus placed in a handy position where it can be conveniently reached for use, and when the sun visor is swung upwards on its pivot arm 14 the mounting means with the map closed thereon are placed substantially out of view.

The mounting means 11 is also arranged so that the map can be readily drawn open for inspection, and when it is released it will again be quickly and automatically returned to its closed position. This means in its preferred form comprises a roller 15 having a pair of pins 16 and 17 at its opposite ends engaging in brackets 18 and 19, which in the illustrated form are secured onto the inward or near side of the depending sun visor 12. The pin 16 is angular and is held in an angular slot 20 in bracket 18, in the usual manner, and has spring means 21 associated therewith to promptly retract the roller and wind up the map when released.

The connecting means between the map and the roller in each of the several forms in this invention is arranged so that the map can be readily attached to the roller and can also be readily detached therefrom and another map substituted therefor. In the form shown in Figs. 3 and 4 this connecting means includes a slot 22 provided in the intermediate part of the roller, and a tab or tongue 23 provided on the upper or inner end of the map 10 to extend thru the slot, as shown in Fig. 4. A tab 24 may also be provided on the lower or outer end of the map to facilitate grasping it for opening the map.

Means is also provided in this invention adapted to engage and to hold the outer end part of the road map, in order that the map can be extended across the nether face of the sun visor while elevated horizontally under the top 13' of the automobile, as shown in Fig. 2, so that the map with its route thereon may be displayed underneath the upswung visor. For economy and simplicity this means is preferably provided in conjunction with the brackets 18 and 19.

The brackets 18 and 19 include attaching arms 26 and 27, respectively, to be secured to the sun visor 12; and when it is desired to accommodate road maps which are wider than the visor, then one arm is a relatively long one adapted to extend beyond the visor, as shown in Fig. 1 by arm 27 at the right-hand end of the visor, the map being shown mounted on the near or inward face of the visor.

One or both of these brackets 18 and 19 are furthermore provided on their outer ends with special means for engaging and holding the outer end part of the map therein; and in the form illustrated in Figs. 1 to 8 this means comprises a hand 28 integral with the bracket and containing fingers 29 with spaces or slots 30 therebetween for receiving and holding the marginal side portion of the map end therein, said fingers extending across said marginal portion.

In Fig. 9 a modified form of the map end holding means is illustrated, which is adapted to clamp the marginal side portion of the map end and hold it on the sun visor. In this form the bracket 19'' contains the lower attaching means 27'' to be secured to the visor, as in the previous form; but it includes a resilient finger 33 mounted upon and extending closely over an upper hand 28'' extending across the marginal portion of the map; and said finger and hand are preferably indented, as shown at 33'', so as to clamp and better hold the marginal part of the map end therebetween.

Figs. 5, 6, and 7 illustrate a modified form of means for securing the upper tab 23 of a map on the roller 15'. This means includes a clamping element 34, in the shape of a rod, which engages in a groove 35 provided on the roller, both extending longitudinally of the roller. The rod is readily secured on the roller by means of bent ends 36 on the rod which are snapped detachably into notches 37 on the ends of the roller, thereby clamping the tab or end of the map in said groove 35. This roller 15' also contains the two end pins 16' and 17' which engage in brackets 18' and 19' that are mounted on the sun visor 12, and this bracket 19' includes the long attaching arm 27', like in the preceding form.

This form of the invention is adapted to accommodate the ordinary rectangular and the substantially striplike road map, and to clamp the straight upper end thereof under said rod in the groove, as well as to accommodate my novel map with its upper attaching tab 23.

It is apparent from the above disclosure that by the use of this invention the road map can be readily mounted on the sun visor in the upper front part of the automobile, so that it can be conveniently extended down from the depending visor for consultation, and can be readily released to be automatically rolled up out of the way, and will be concealed by the visor when that is swung into its upper horizontal position; and it is also apparent that the map can be extended around the nether face of the elevated visor, with the end of the map held by the disclosed map end holding means on the bracket means, so that the route on the map may be continuously held exposed to view on the nether side of the upswung sun visor in an out-of-the-way position.

I claim:

1. A device for supporting a road map on a sun visor adjustable in an automobile, said device comprising a roller and a road map and means whereby the map is mounted on the roller to be extended therefrom and automatically retracted and also conveniently detached for exchange, bracket means for mounting the roller with its map on one face of the visor, whereby the map may be displayed depended from the depending visor, and means on the device for engaging a part of the map when extended, to hold it stationary, whereby the map may also be held in place when extended across the nether face of the unswung visor to display the route underneath said nether face.

2. A device for mounting a road map on a sun visor which is mounted in an automobile to be depended therein and also to be swung upwards into an out-of-the-way position, said device comprising a roller and means for mounting the map on the roller to conveniently open and close the same and also to detach and exchange it, bracket means whereby the roller with the map is mounted on a face of the depending visor, whereby the map can be displayed while extended from the visor, and means on the bracket means for engaging and holding the marginal end part of the map when extended, whereby the map can be retained extended across the nether face of the upswung visor with the map end held upon the latter, to display the route on the underside of the visor.

3. The subject matter set forth in claim 2, wherein the means for holding the marginal end part of the map is in the form of spaced integral fingers extending from the bracket for holding said marginal part therebetween.

4. The subject matter set forth in claim 2, wherein the means for holding the marginal end part of the map includes a portion extending from the bracket and having a resilient finger thereon for clamping said marginal part between said finger and portion.

5. A device for mounting a road map on a sun visor in an automobile, said device comprising a roller and a map detachably mounted thereon to be readily extended therefrom and automatically retracted, and bracket means including a bracket with a relatively long attaching arm for mounting a roller on a visor to extend beyond the visor, and facilitate mounting the map on a visor which is narrower than the map.

6. A device for mounting a road map on a sun visor in an automobile, said device comprising a roller and a map mounted thereon to be readily extended and automatically retracted, a pair of brackets for detachably mounting the roller on a face of the depending visor, one of said brackets having a relatively long attaching arm for mounting a roller on a visor so as to extend beyond the visor, to facilitate mounting the map on a visor which is narrower than the map, and for readily displaying the map depended from the depending visor, and means on at least one of said brackets for engaging an extending end part of the map and hold it in place, whereby the map can be held in a visible position while extended across the nether face of the unswung visor to display the route on said nether face.

7. A device for mounting a road map on a sun visor which is swingably mounted in an automobile, said device comprising a roller and a map and means for mounting the map on the roller to be readily extended therefrom and automatically retracted, and also readily detached for replacement, a pair of brackets for mounting the roller on a face of the visor, one of the brackets having a relatively long attaching arm to facilitate mounting the map on a visor which is narrower than the map, and spaced means on the brackets for receiving therebetween the marginal side portions on the extended part of the map and holding it in place, whereby the map can be held extended to display the route across the nether face of the upswung visor.

WILLIAM G. HARDT.